United States Patent [19]
Rupp

[11] 3,866,358
[45] Feb. 18, 1975

[54] METHOD AND APPARATUS FOR GENERATING TOROIDAL SURFACES

[75] Inventor: Wiktor J. Rupp, Lowell, Mass.

[73] Assignee: Itek Corporation, Lexington, Mass.

[22] Filed: Aug. 2, 1973

[21] Appl. No.: 385,213

[52] U.S. Cl. .................................. 51/33 R, 51/284
[51] Int. Cl. ........ B24b 7/00, B24b 9/00, B24b 1/00
[58] Field of Search ............. 51/74 R, 96, 338, 284, 51/124

[56] References Cited
UNITED STATES PATENTS

| | | | |
|---|---|---|---|
| 2,541,873 | 2/1951 | Holman | 51/284 |
| 2,600,815 | 6/1952 | Tunner | 51/284 |
| 2,633,675 | 4/1953 | Ellis | 51/284 X |
| 3,117,396 | 1/1964 | Dalton | 51/33 R |
| 3,492,764 | 2/1970 | Dalton | 51/284 X |

*Primary Examiner*—Othell M. Simpson
*Attorney, Agent, or Firm*—Homer O. Blair; Robert L. Nathans; Gerald H. Glanzman

[57] ABSTRACT

Method and apparatus for generating finely ground toroidal surfaces on workpieces. A generally disc-shaped surfacing tool having a double grit annular peripheral grinding surface and an initial radius substantially equal to the radius of the curvature to be generated in the direction of a first major meridian of the workpiece is caused to sweep across the workpiece along a curved path having a radius equal to the radius of the curvature to be generated in the direction of a second major meridian of the workpiece perpendicular to the first major meridian in order to generate a high quality toroidal surface on the workpiece ready for polishing. In order to compensate for the reduction in the tool radius due to wear, which reduction would normally change the curvature of the workpiece in the direction of the first meridian, means are provided to change the orientation of the tool relative to the curved path in a prescribed manner such that the tool will present an "effective" radius to the workpiece that remains substantially constant. The technique enables accurate toroidal surfaces to be generated on large numbers of workpieces without necessitating frequent reconditioning or replacement of the tool. The system is thus especially well suited for grinding toroidal surfaces on ophthalmic lenses in mass production operations.

9 Claims, 1 Drawing Figure

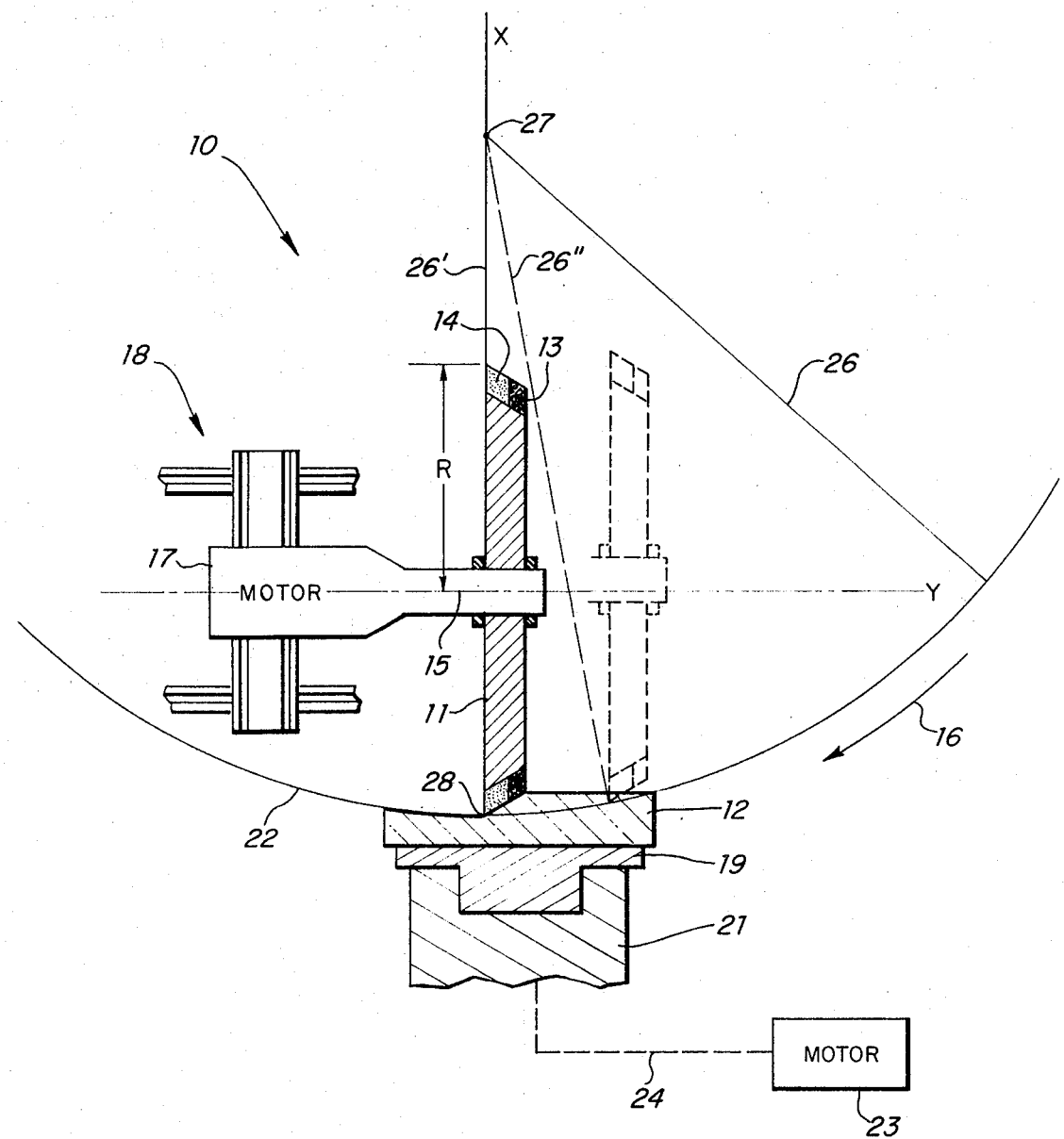

METHOD AND APPARATUS FOR GENERATING TOROIDAL SURFACES

BACKGROUND OF THE INVENTION

1. Field of the Invention

The present invention relates generally to a method and apparatus for generating toroidal surfaces. More specifically the invention relates to a method and apparatus for generating finely ground toroidal surfaces on ophthalmic lenses in an efficient one-step operation.

2. Description of the Prior Art

A toroidal surface is a surface of compound curvature in which the curvature measured in the direction of a first major meridian of the surface is of a different radial dimension than when measured in the direction of a second major meridian normal to and passing through the first meridian. Such surfaces are important in many fields and are of particular value in the design of ophthalmic lenses wherein they are used to correct astigmatism.

Because of their importance to the ophthalmic field, a variety of techniques have been developed in the past to generate such surfaces on lenses. Perhaps the most common technique is to generate the surface with a tool having an abrading face precisely preformed to the toric shape desired on the lens. By appropriately moving such a tool relative to the lens surface, the surface will gradually assume the shape of the abrading face.

Although such a procedure can produce a reasonably accurate toroidal surface, it is not fully satisfactory for a variety of reasons. Initially, in the ophthalmic field it is necessary to provide lenses having a large number of different toroidal curvatures in order to adequately satisfy the prescription requirements of all patients, and, since each tool is preformed to generate only a single surface shape, it becomes necessary to stock, service, recondition and replace large numbers of differently shaped tools. This obviously results in a significant amount of expense and inconvenience. Also, this technique is quite slow and, as a result, a large number of machines are needed to produce and maintain an adequate supply of lenses.

Because of these inadequacies a so-called "universal" or cup-shaped generating tool has been developed with which toroidal surfaces having different curvatures can be generated utilizing the same tool. These tools, however, are still not fully satisfactory in many applications because they tend to introduce elliptical errors into the lens (i.e., a flattening out of the lens surface in peripheral areas) as well as other surface irregularities which are not acceptable. Attempts have been made to overcome these deficiencies by moving the tool relative to the lens in complex paths involving several movements superimposed on one another. This, however, makes it necessary to employ complex machinery that is quite expensive and requires careful monitoring and adjustment, and, as a result, such systems are not very suitable for high speed mass production operation.

In essentially all of these prior art techniques also, two operations must be employed, a rough grinding step to roughly generate the desired surface shape, and a fine grinding step to remove imperfections introduced by the rough grinding step. Because of this two-step operation, the wearing down of the rough grinding tool can usually be compensated for in the fine grinding step, however, the fine grinding is performed by a lapping operation in which the lap surface must be very accurate and, therefore, constantly monitored and frequently corrected in a costly truing operation.

In general, a suitable technique is not presently available in the prior art that will permit toroidal surfaces to be generated on lenses in a mass production operation and that will produce in a single operation surfaces ready for polishing without necessitating complex or expensive equipment or extensive follow-up fining.

SUMMARY OF THE PREFERRED EMBODIMENT OF THE INVENTION

In accordance with a preferred embodiment of the present invention, the above deficiencies have been obviated by providing a novel surfacing apparatus which can accurately generate toroidal surfaces on large numbers of lenses for an extended period of time without any loss in quality and without the need to frequently recondition or replace the generating tool. In accordance with the presently preferred embodiment, the apparatus comprises a disc tool having a double grit abrasive surface supported around its periphery and provided with a radius that is approximately equal to the radius of the curvature to be generated in the direction of one major meridian of the lens surface, generally the cross curve. Also, the lens and tool are mounted to be swept across one another along a curved path having a radius equal to the radius of the curvature to be generated along the second major meridian of the lens, generally the base curve, and, upon doing so, both curvatures can be simultaneously generated on the lens surface in a rapid and efficient manner to provide a finely ground surface ready for polishing.

Since, in this technique, the radius of the tool determines the curvature to be applied to the lens surface in the direction of one meridian, it is obvious that as the tool wears during use and its radius changes, the curvature being generated on the lens in the direction of that meridian will also change. In the prior art, as mentioned above, this requires frequent replacement of the tool with its attendant cost and delay. The present invention, however, has effectively solved this problem by providing structure which, when properly used, will maintain the "effective" grinding radius of the tool constant relative to the lens surface notwithstanding the fact that the actual radius of the tool changes due to wear.

In accordance with the preferred embodiment, this structure includes an X-Y table to which the tool is mounted for independent movement in two orthogonal directions. As the tool wears, this table is used to shift the position of the tool relative to the lens being swept thereacross by amounts that will cause the tool to continue to present to the lens surface a curvature that corresponds to the desired curvature to be formed. In practice, the tool is moved in very small increments at regular intervals as the tool wears, and, as a result, as many as 25,000 lenses may be surfaced within required tolerances before replacement of the tool becomes necessary. This makes the system extremely versatile and perfectly suited for mass production operations.

The tool is also provided with a double grit grinding surface so that both rough and fine grinding operations may be performed simultaneously on the lens. Accordingly, upon the completion of one sweep of the lens across the tool, the lens will be in condition for polishing without lapping steps being required.

The apparatus is quite simple in operation and yet highly effective. It avoids the need for the complex multiple movements employed in the prior art and is thus quite inexpensive in construction and in operation. Furthermore, by relatively simple adjustments, the same tool can be used to generate toroidal surfaces having a variety of base or cross curvatures either by adjusting the sweep of the lens to the tool or by adjusting the position of the tool relative to the sweep or both. Yet further important features of the invention will be emphasized hereinafter along with the detailed description of the drawings.

BRIEF DESCRIPTION OF THE DRAWINGS

The FIGURE illustrates, in somewhat schematic form, the apparatus according to a preferred embodiment of the invention.

DETAILED DESCRIPTION OF THE PREFERRED EMBODIMENT OF THE INVENTION

The FIGURE illustrates, in somewhat schematic form, the apparatus according to a presently preferred embodiment of the invention for generating toroidal surfaces on lenses. The apparatus, which is generally designated by reference number 10, includes a circular disc-shaped grinding tool 11 around the periphery of which is secured an abrasive material for grinding a lens blank 12 to be carried thereacross. The abrasive material (which may consist of bonded diamond particles or the like) are preferably provided in two grit sizes so as to enable rough and fine grinding operations to be performed on the lens simultaneously as the lens is being swept thereacross. More specifically, the tool is provided with a rough abrasive portion 13 having a grit size of between about 100–180 mesh particles and a fine grinding abrasive portion 14 having a grit size of between about 400–600 mesh particles depending upon the type of glass or plastic being ground and upon the polishing requirements. With the tool constructed in this manner, when lens blank 12 is carried across the abrasive surface in the direction shown by arrow 16, the blank will initially encounter rough grinding portion 13 which will roughly reduce the lens blank 12 to the general curvature desired, and will immediately thereafter encounter fine grinding portion 14 which will remove any imperfections in the lens surface introduced by the rough grinding operation. Following one sweep of the lens blank across the tool in this manner, the lens will generally be in condition for polishing without any further treatment.

The tool 11 is coupled to a motor 17 capable of rapidly rotating the tool (e.g., 4,000–7,000 RPM) around its central axis 15. The motor 17 is itself mounted on an X–Y table 18 of generally conventional type so that it and the tool 11 may be moved up or down and/or to the left or right as shown in the FIGURE in very small increments as will be explained in greater detail hereinafter.

The structure of the FIGURE is completed by mounting the lens blank 12 to an appropriate lens block 19 by a suitable cement or other conventional material and then inserting the blocked lens into an appropriate holder 21 for movement. Holder 21 is coupled to a motor 23 by means of mechanical connection 24 (shown schematically only for clarity) to be moved back and forth along a curved path 22.

The manner in which this apparatus can be effectively utilized to generate toroidal surfaces on large numbers of lenses will now be explained in detail. Initially, a tool 11 is selected that has a radius substantially equal to the radius of the curvature to be generated in the direction of one major meridian of the lens (i.e., the merdian perpendicular to the plane of the FIGURE). This will generally be the shorter radius curve of the lens, although this is not essential. The tool radius is shown as radius R in the FIGURE which is the maximum radial dimension of the tool, although, because of the substantial adjustability of the apparatus as will be explained hereinafter, exact correspondence is not essential in order to obtain the correct curvature on the lens. It should also be understood that the slope of the grinding surfaces 13 and 14 is somewhat exaggerated in the FIGURE for clarity, the actual slope being only 2 mils or so.

At the same time, the blocked lens blanked 12 is mounted in holder 21 which is adjusted to be carried along a curved path 22 having a radius 26 equal to the radius of the curvature to be generated in the direction of the second major meridian of the lens perpendicular to the first meridian (i.e., the meridian in the plane of the FIGURE, and usually the base curve). The tool is also initially oriented relative to the path 22 such that the tool axis 15 will be perpendicular to a radial line 26' drawn from the center of curvature 27 of the path 22 to the line of contact between the lens blank and the maximum radial extremity of the tool. Put another way, the tool is oriented perpendicular to a tangent to the curve 22 at the point where the maximum radial dimension of the tool touches the curve (i.e., at point 28 in the FIGURE). This initial tool position is illustrated in solid lines in the FIGURE. Upon properly orienting the tool relative to path 22 as described above, when the lens blank and the tool are moved relative to one another along the curved path 22 in the direction of arrow 16, the tool will generate a first base curvature on the lens having a radius equal to radius 26 while simultaneously generating a second cross curvature on the lens equal to the radius R of the tool. Further, as the lens is swept across the tool it will be roughly ground by rough grinding portion 13 and immediately thereafter be finely ground by fine grinding portion 14. Accordingly, the lens will be provided with a high quality toroidal surface ready to be polished. The speed of the sweep will be about 30–60 seconds per lens depending on the lens material and the abrasive used.

As is apparent from the FIGURE, the curvature in the direction of the cross curve of the lens (perpendicular to the plane of the FIGURE) is equal to the radius R of the tool, and, accordingly, it is clear that as the tool radius changes due to wear, the radius of the curvature generated on the lens in the direction of the cross curve will also change. In prior art techniques, tool wear necessitates frequent reconditioning or replacement of the fine grinding lap so that the correct toroidal shape can be maintained. The present invention, however, avoids the need for this by providing means for adjusting the position of the tool relative to the sweep of the lens as the tool wears down. More particularly, the present invention provides apparatus for compensating for the tool wear by moving the tool slightly relative to its original orientation with path 22. Basically, this is accomplished by tilting the tool relative to its original position so that the axis 15 of the tool will not be perpendicular to the radial line (26′) drawn from the center of curvature 27 of path 22 to the point of contact 28 of the tool with curve 22 as distinguished from its original orientation where tool axis 15 was perpendicular to the radial line (26′). By adjusting the tool orientation in this way, the tool face will present to the lens blank surface an "effective" radius which is slightly larger than the actual radius of the tool and thus continue to generate the desired radius on the blank.

This adjustment may be accomplished by actually tilting the tool relative to path 22, but a more preferable technique is to move the tool slightly to the right and up by means of X–Y table 18. This new position is shown in dotted lines in the FIGURE and, it should be emphasized that the extent of movement illustrated in the FIGURE is actually much greater than the actual movement for purposes of clarity. Basically, the movement is such that the edge 28 of the tool will still contact curved path 22 but be slightly forward of its orginal position relative to the moving lens blank. In this new position, the tool will present a somewhat larger radius to the lens than its true radius and, accordingly, the curvature generated on the lens surface in the direction of the cross curve will remain substantially constant notwithstanding the tool wear. Since the radius of curved path 22 is not changed, the curvature of the lens in the direction of the base meridian will also remain unchanged. The X–Y table is provided with the conventional guages and motors to independently move the tool up or down and/or to the left or right by precise amounts, although, for purposes of clarity, this conventional structure has not been illustrated.

In order to ensure that the curvature on the lenses remain accurate within the accepted manufacturing tolerances, the tool should be adjusted after it wears down approximately 2 or 3 mils, or, in a mass production operation, about every 8 hours. Further adjustments can be made until the tool wears down about one-tenth of an inch, after which replacement finally becomes necessary. At this time, however, the tool may still be used to generate lenses having shorter cross curve radii. As many as 25,000 lenses can be accurately generated, however, with the same tool before replacement is necessary.

The extent of adjustment of the tool to precisely correct for tool wear can readily be determined by employing the following equations:

$$x = (R_T \cdot R_B / R_C) - R_T,$$

and $$y = R_B \sqrt{1 - (R_T^2/R_C^2)}$$

where $x$ and $y$ are the amount of tool movement in the direction of the X- and Y-coordinates shown in the FIGURE;
$R_T$ = tool radius;
$R_B$ = Base curve radius; and
$R_C$ = Cross curve radius.

Because of the adjustability of this apparatus, it becomes possible to generate an entire series of cross curvatures with an inventory of tools having radii which differ in approximately 0.25 diopter steps. This is because any one tool can be adjusted to grind any desired cross curvature within that range. Furthermore, the same tool can be readily employed to generate lenses of differing base curvatures by simply changing the radius 26 of curved path 22. This means that a reduced inventory of tools are needed to generate a full line of toroidal surfaces sufficient to satisfy all prescription requirements.

The system is particularly well suited for use in mass production line techniques not requiring operator assistance or continuous monitoring.

In conclusion, the present invention provides a system which will permit high quality toroidal surfaces to be generated on lenses rapidly, efficiently and with a minimum of operator supervision. The tools need be replaced only very infrequently and this permits lenses to be generated at a reduced cost.

It should be understood that what has been described is a preferred embodiment only and that the system could take many other forms. For example, if desired, the lens blank may be held stationary and the tool swept across curved path 22. Alternatively, rather than employing the X–Y table as shown in the FIGURE, some alternative structure for tilting or moving the tool may be provided. Yet other additions, alterations and omissions will readily become apparent to those skilled in the art and accordingly, it should be understood that the invention should be limited only as required by the scope of the following claims.

What is claimed is:

1. Apparatus for generating a toroidal surface on a workpiece comprising:
   a. means for supporting a workpiece upon which said toroidal surface is to be generated;
   b. means for supporting a surfacing tool adjacent said workpiece for generating said toroidal surface thereupon, said surfacing tool comprising a disc tool having a substantially annular peripheral surfacing face symmetrical about a central tool axis, the radius of said annular peripheral surfacing face being generally equal to the radius of the curvature to be generated in the direction of a first major meridian of said toroidal surface;
   c. first drive means for transversely sweeping said tool and said workpiece relative to one another in a curved path having radius substantially equal to the radius of the curvature to be generated in the direction of a second major meridian of said toroidal surface; and
   d. adjustment means for adjusting the orientation of said tool relative to said curved path for maintaining the radius of the curvature to be generated along said first major meridian of said toroidal surface substantially constant as the radius of said tool changes due to wear.

2. Apparatus as recited in claim 1 wherein said adjustment means comprises means for tilting said tool relative to said curved path by increasingly greater amounts as the radius of said tool changes due to wear.

3. Apparatus as recited in claim 2 wherein said means for tilting said tool relative to said curved path comprises means for incrementally moving said tool to different positions along said curved path as the radius of said tool changes due to wear.

4. Apparatus as recited in claim 3 wherein said incremental moving means comprises an X–Y table.

5. Apparatus as recited in claim 1 wherein said annular peripheral surfacing face comprises a rough abrasive portion for roughly grinding said workpiece and a fine abrasive portion for finely grinding said workpiece subsequent to the rough grinding thereof.

6. A method for generating a toroidal surface on a workpiece comprising the steps of:
   a. supporting a workpiece upon which said toroidal surface is to be generated;
   b. supporting a disc tool adjacent to said workpiece for generating said toroidal surface thereupon, said disc tool including a substantially annular peripheral surfacing face symmetrical about a central tool axis and having a radius generally equal to the radius of curvature to be generated in the direction of a first major meridian of said toroidal surface;
   c. transversely sweeping said tool and said workpiece relative to one another along a curved path having a radius substantially equal to the radius of curvature to be generated in the direction of a second major meridian of said toroidal surface; and
   d. periodically adjusting the orientation of said tool relative to said curved path for maintaining the radius of the curvature to be generated in the direction of said first major meridian of said toroidal surface substantially constant as the radius of said tool changes due to wear.

7. A method as recited in claim 6 wherein said adjusting step comprises the step of tilting said tool relative to said curved path by increasingly greater amounts as the radius of said tool decreases due to wear.

8. A method as recited in claim 7 wherein said tilting step comprises the step of shifting said tool to different positions along said curved path as the radius of said tool changes due to wear.

9. A method as recited in claim 8 wherein said shifting step comprises shifting said tool in accordance with the following equations:

$$x = (R_T \cdot R_B / R_C) - R_T \text{ and}$$
$$y = R_B \sqrt{1 - (R_T^2/R_C^2)}$$

wherein
$x$ is the amount of tool movement in the coordinate direction perpendicular to the tool axis;
$y$ is the amount of tool movement in the coordinate direction parallel to the tool axis;
$R_T$ = tool radius;
$R_B$ = the radius of curvature to be generated in the direction of said second major meridian of said toroidal surface; and
$R_C$ = the radius of curvature to be generated in the direction of said first major meridian of said toroidal surface.

* * * * *